(12) United States Patent
Arrasvuori

(10) Patent No.: US 8,681,181 B2
(45) Date of Patent: Mar. 25, 2014

(54) METHODS, APPARATUSES, AND COMPUTER PROGRAM PRODUCTS FOR COMPRESSION OF VISUAL SPACE FOR FACILITATING THE DISPLAY OF CONTENT

(75) Inventor: Juha Arrasvuori, Tampere (FI)

(73) Assignee: Nokia Corporation, Espoo (FI)

( * ) Notice: Subject to any disclaimer, the term of this patent is extended or adjusted under 35 U.S.C. 154(b) by 71 days.

(21) Appl. No.: 13/217,060

(22) Filed: Aug. 24, 2011

(65) Prior Publication Data

US 2013/0050269 A1 Feb. 28, 2013

(51) Int. Cl.
*G09G 5/00* (2006.01)
*G06F 3/048* (2013.01)

(52) U.S. Cl.
USPC ............ 345/661; 345/660; 345/665; 715/800

(58) Field of Classification Search
USPC .......................... 345/660–671; 715/800–801
See application file for complete search history.

(56) References Cited

U.S. PATENT DOCUMENTS

| | | | |
|---|---|---|---|
| 6,044,385 | A | 3/2000 | Gross et al. |
| 7,075,512 | B1 | 7/2006 | Fabre et al. |
| 7,495,678 | B2 | 2/2009 | Doyle et al. |
| 7,890,257 | B2 * | 2/2011 | Fyke et al. .................... 701/431 |
| 2006/0082901 | A1 | 4/2006 | Shoemaker |
| 2010/0262907 | A1 | 10/2010 | Shoemaker et al. |
| 2010/0302176 | A1 | 12/2010 | Nikula et al. |
| 2011/0122157 | A1 * | 5/2011 | Fabre et al. .................... 345/661 |
| 2013/0009997 | A1 * | 1/2013 | Boak et al. .................... 345/661 |

FOREIGN PATENT DOCUMENTS

| | | |
|---|---|---|
| EP | 2 079 052 A1 | 7/2009 |
| WO | WO 02/21437 | 3/2002 |
| WO | WO 02/50654 | 6/2002 |

OTHER PUBLICATIONS

International Search Report and Written Opinion from International Application No. PCT/FI2012/050796, mailed Dec. 28, 2012.
Doodle® Calendar Connect screen http://doodle.com.

* cited by examiner

*Primary Examiner* — Maurice L McDowell, Jr.
*Assistant Examiner* — Donna J Ricks
(74) *Attorney, Agent, or Firm* — Alston & Bird LLP

(57) ABSTRACT

Methods, apparatuses, and computer program products are herein provided for optimizing content display on a user interface. A method may include receiving an indication of user input indicating that a first portion of a display of a map is to be one of compressed or expanded. The method may further include causing the one of compression or expansion to the first portion of the display. The method may also include determining, based at least in part on the first portion of the display, at least one second portion of the display. The method may further include causing another one of compression or expansion to the at least one second portion of the display such that the second portion of the display is modified in a different manner than the first portion of the display. Corresponding apparatuses and computer program products are also provided.

20 Claims, 18 Drawing Sheets

METHODS, APPARATUSES, AND COMPUTER PROGRAM PRODUCTS FOR COMPRESSION OF VISUAL SPACE FOR FACILITATING THE DISPLAY OF CONTENT

TECHNOLOGICAL FIELD

Example embodiments of the present invention relate generally to user interface technology and, more particularly, relate to methods and apparatuses for compressing visual space to facilitate the presentation of content on a display.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

Often, considering the small form factor, mobile computing devices have limited space for content display. Moreover, the display of certain content may be more desirable than the display of other content, although the determination of which content is more desirable may depend on the specific user. Ultimately, considering that content display is important for a user's experience, advancements in optimization of content display are advantageous.

BRIEF SUMMARY

The importance of content display is paramount, particularly when a display has limited space. Moreover, a user may find certain portions of the content more desirable than others. While current displays offer zoom functions, these functions are limited because the remaining content not zoomed in on often disappears. This may be problematic for a user that wishes to still have immediate access to the content that disappeared in response to the zooming. Moreover, a user may wish to zoom multiple portions of content at the same time and, if the different portions of the content are spaced apart on the display, obtaining a desirable zoom may be difficult for both portions of content (e.g., a start point and a destination on a map, a current location and a destination, etc.). In such circumstances, the content between the different portions of zoomed content may be of less importance, but still relevant.

As such, embodiments of the present invention provide methods, apparatuses, and computer program products for compressing visual space to optimize the presentation of certain content on a display. By compressing less desirable visual space and/or content, a display may be selectively optimized for viewing content that is more desirable to the user. For example, a user may wish to focus on a certain region of interest in the display while maintaining some relative display of other regions. Embodiments of the present invention allow for the region of interest to be zoomed in on while automatically zooming out of the other regions, thereby optimizing display of the region of interest. Moreover, in some embodiments, multiple compressed and/or expanded content areas may be provided to allow for a fully customizable display for a user. Additionally, in some embodiments, a user may scroll between already compressed or expanded content, enabling a user to change the content being manipulated to create a dynamic viewing application.

In one example embodiment, a method may include receiving an indication of user input indicating that a first portion of a display of a map is to be one of compressed or expanded. The method may further include causing the one of compression or expansion to the first portion of the display. The method may also include determining, based at least in part on the first portion of the display, at least one second portion of the display. The method may further include causing another one of compression or expansion to the at least one second portion of the display such that the second portion of the display is modified in a different manner than the first portion of the display.

In another example embodiment, an apparatus comprising at least one processor and at least one memory storing computer program code, wherein the at least one memory and stored computer program code are configured, with the at least one processor, to cause the apparatus to receive an indication of user input indicating that a first portion of a display of a map is to be one of compressed or expanded. The at least one memory and stored computer program code are configured, with the at least one processor, to further cause the one of compression or expansion to the first portion of the display. The at least one memory and stored computer program code are configured, with the at least one processor, to further determine, based at least in part on the first portion of the display, at least one second portion of the display. The at least one memory and stored computer program code are configured, with the at least one processor, to further cause another one of compression or expansion to the at least one second portion of the display such that the second portion of the display is modified in a different manner than the first portion of the display.

In another example embodiment, a computer program product is provided. The computer program product of this example embodiment includes at least one computer-readable storage medium having computer-readable program instructions stored therein. The program instructions of this example embodiment comprise program instructions configured to cause an apparatus to perform a method comprising receiving an indication of user input indicating that a first portion of a display of a map is to be one of compressed or expanded. The method may further include causing the one of compression or expansion to the first portion of the display. The method may also include determining, based at least in part on the first portion of the display, at least one second portion of the display. The method may further include causing another one of compression or expansion to the at least one second portion of the display such that the second portion of the display is modified in a different manner than the first portion of the display.

In another example embodiment, an apparatus is provided. The apparatus comprises means for receiving an indication of user input indicating that a first portion of a display of a map is to be one of compressed or expanded. The apparatus may further comprise means for causing the one of compression or expansion to the first portion of the display. The apparatus may further comprise means for determining, based at least in part on the first portion of the display, at least one second portion of the display. The apparatus may further comprise means for causing another one of compression or expansion to the at least one second portion of the display such that the second portion of the display is modified in a different manner than the first portion of the display.

BRIEF DESCRIPTION OF THE DRAWINGS

Figure 1:
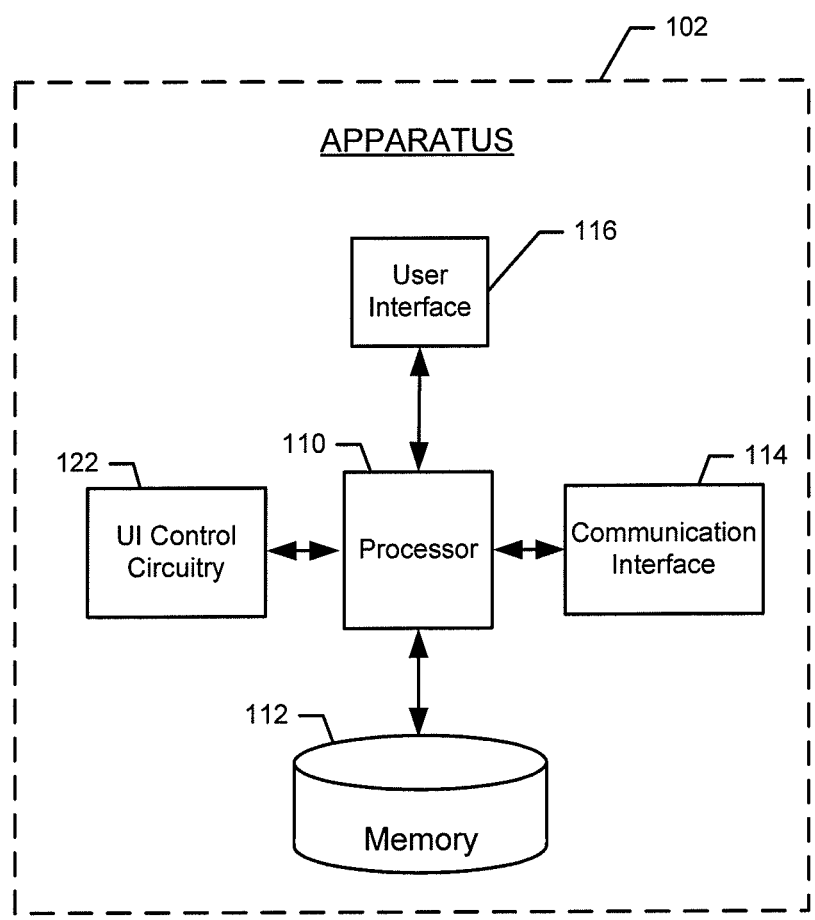
Figure 2:
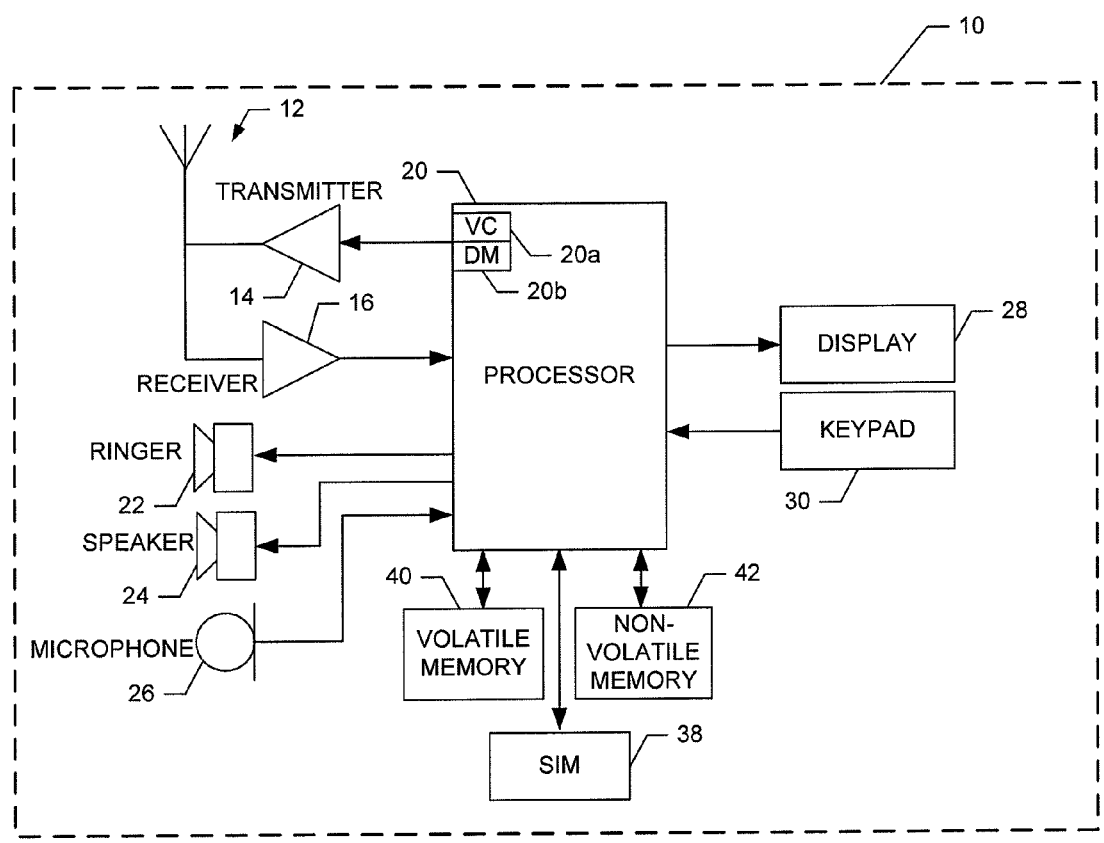
Figure 4A:
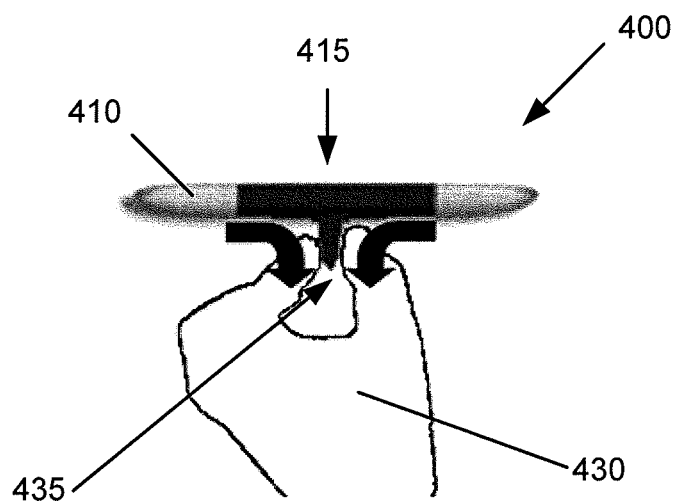
Figure 4B:
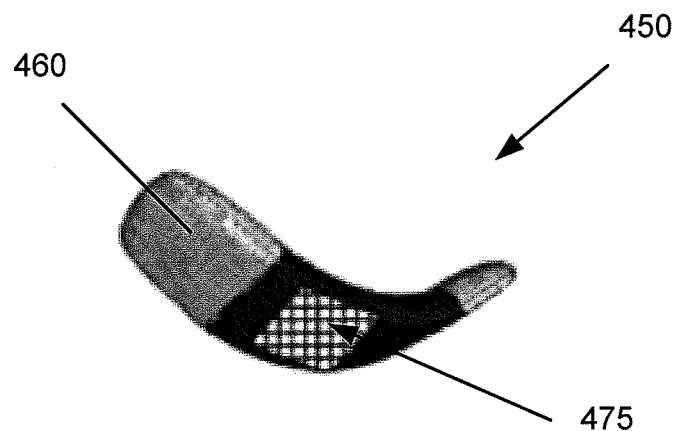
Figure 5A:
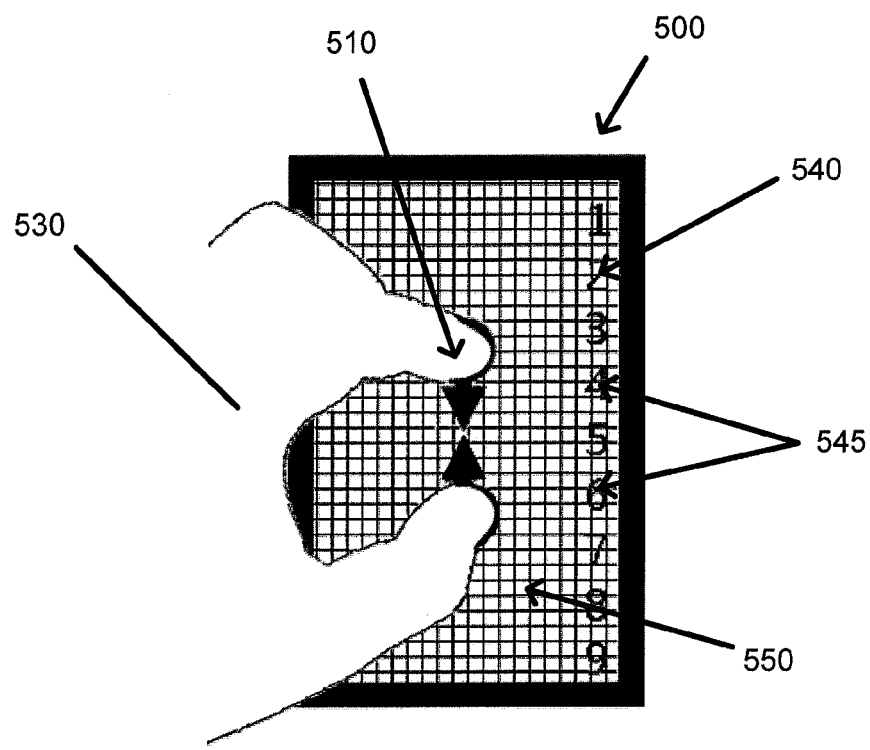
Figure 5B:
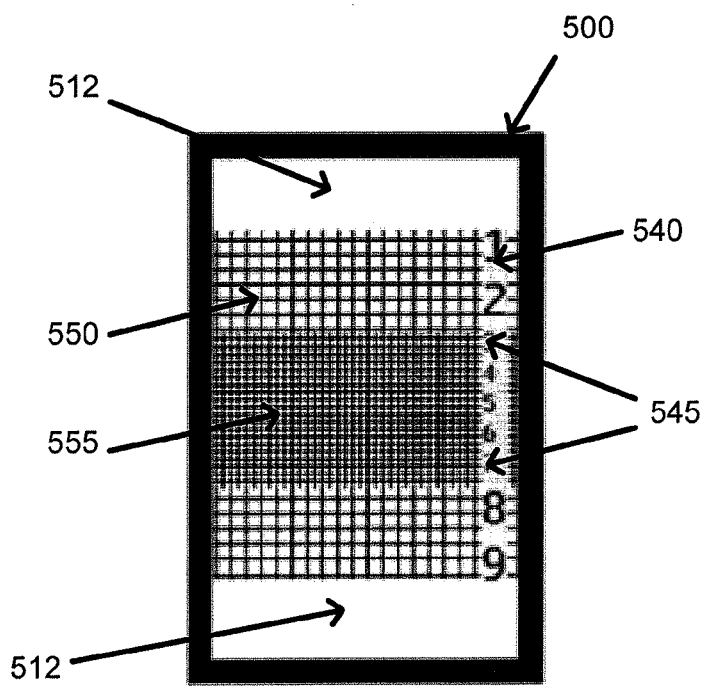
Figure 5C:
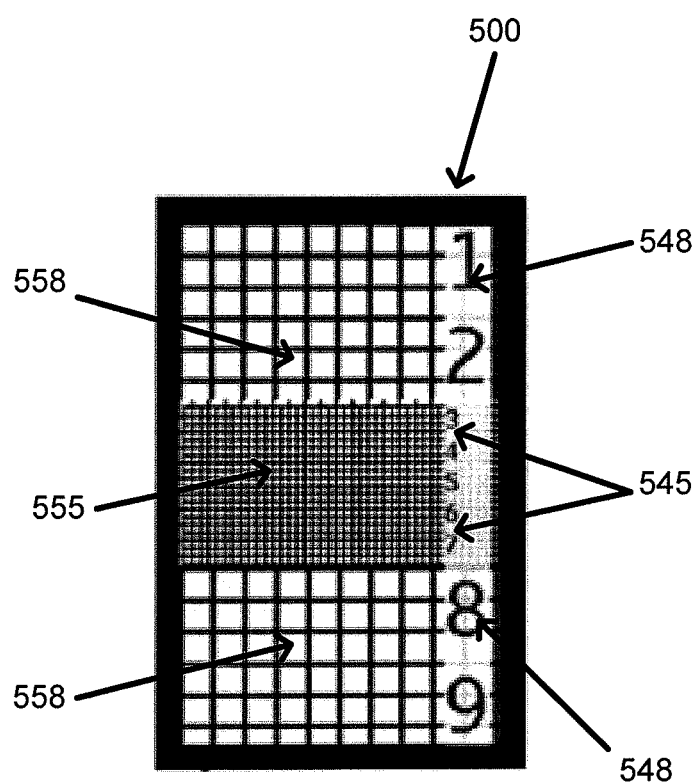
Figure 6A:
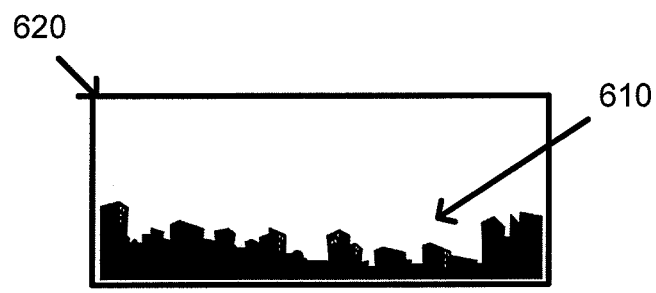
Figure 6B:
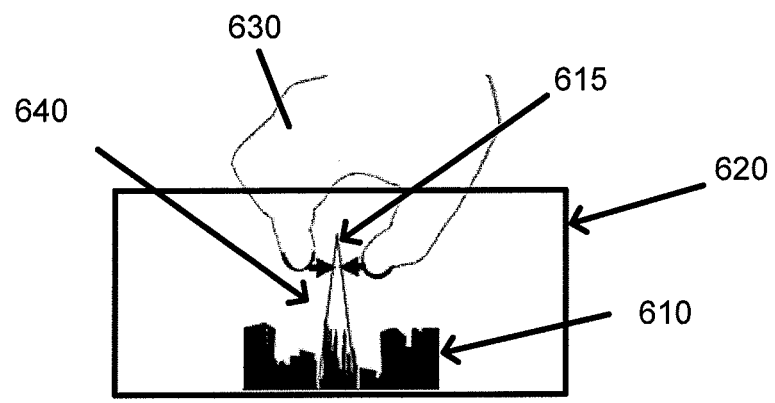
Figure 6C:
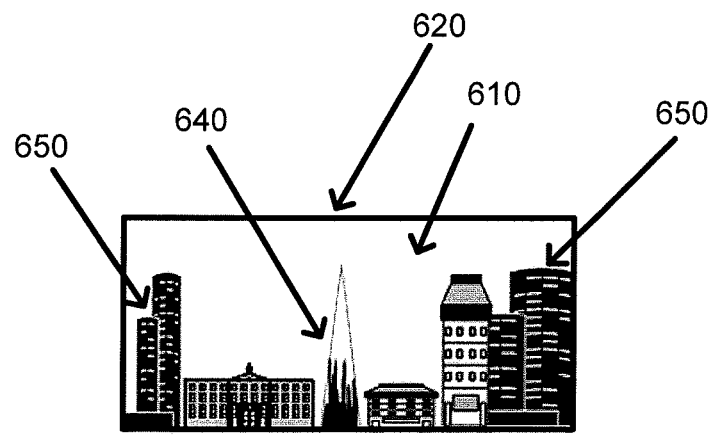
Figure 7A:
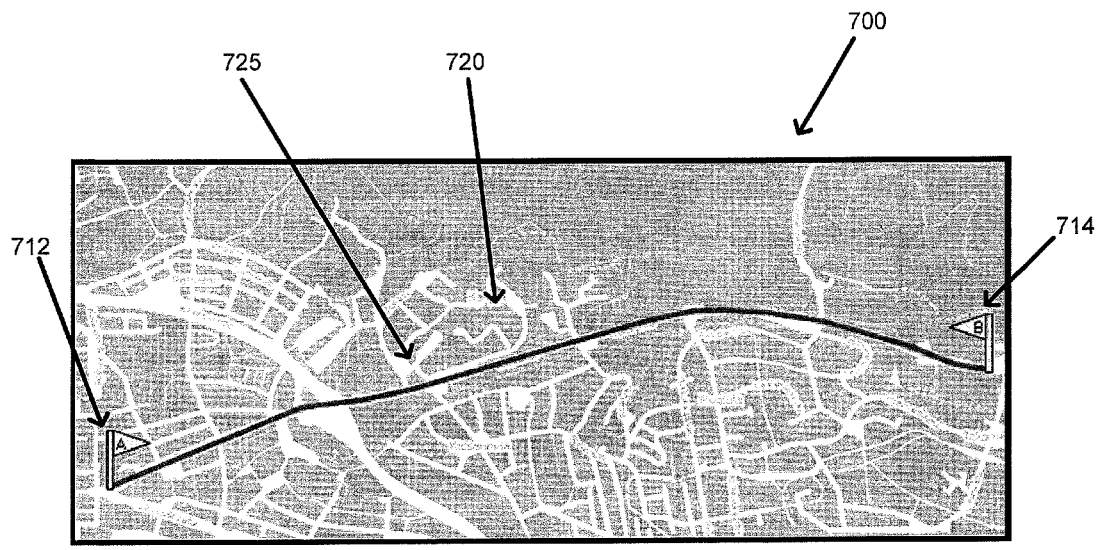
Figure 7B:
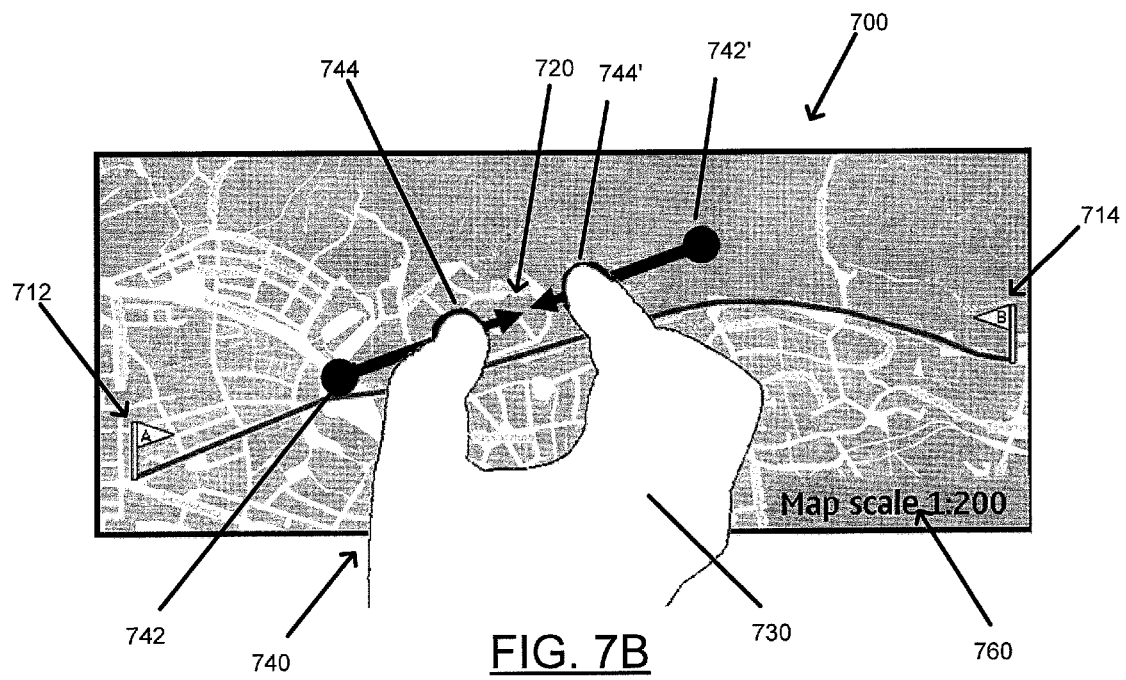
Figure 7C:
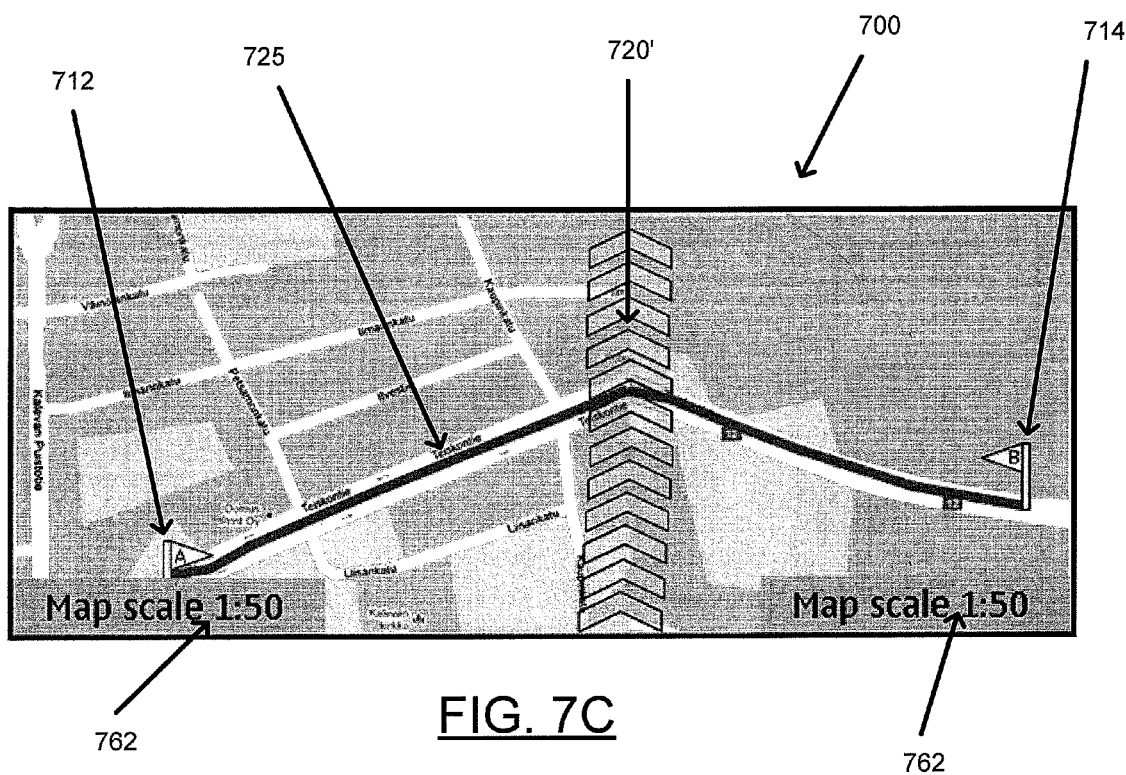
Figure 9A:
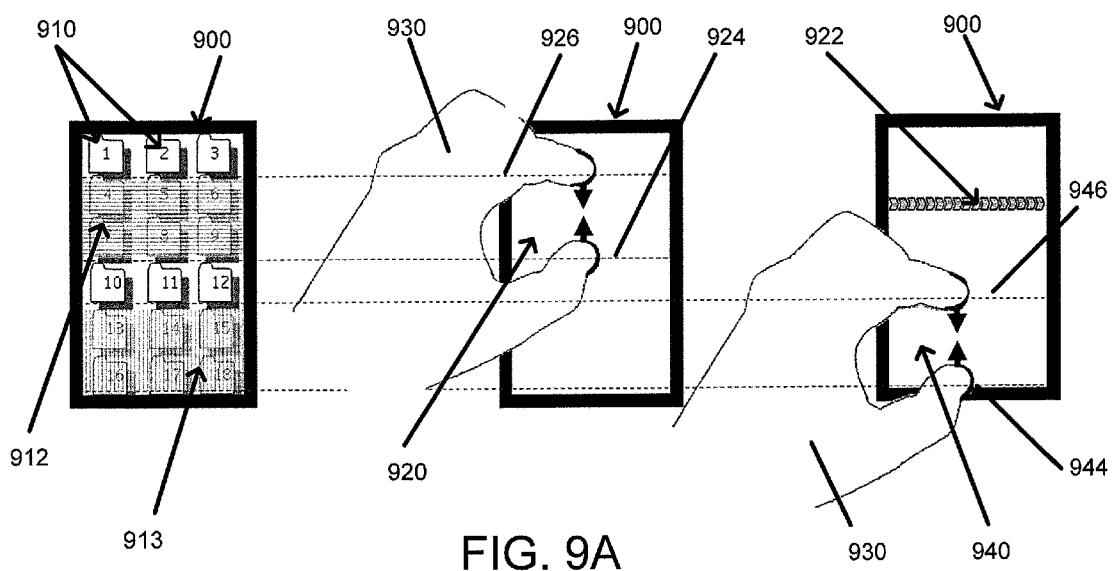
Figure 9B:
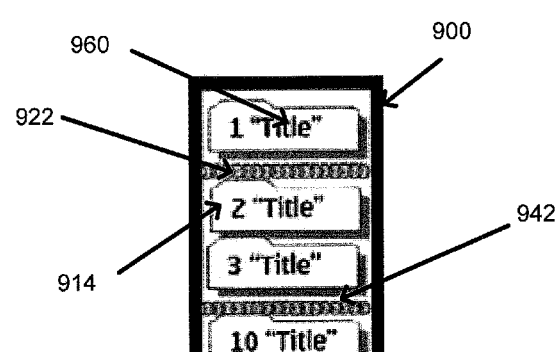
Figure 10A:
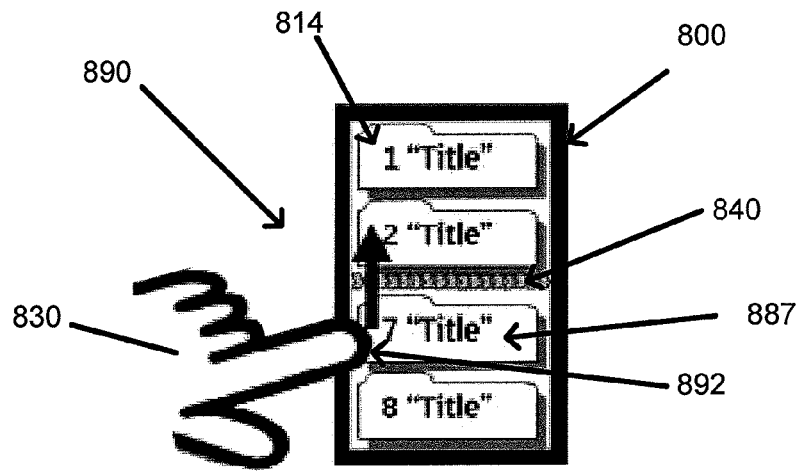
Figure 10B:
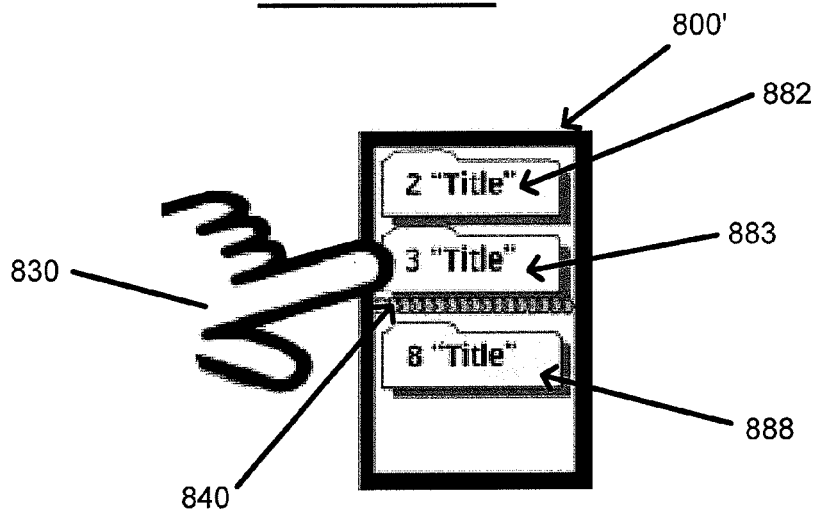
Figure 10C:
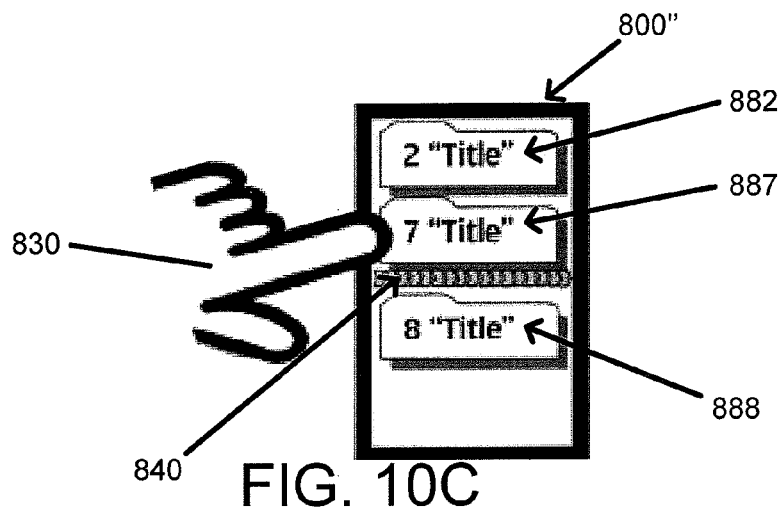
Figure 11:
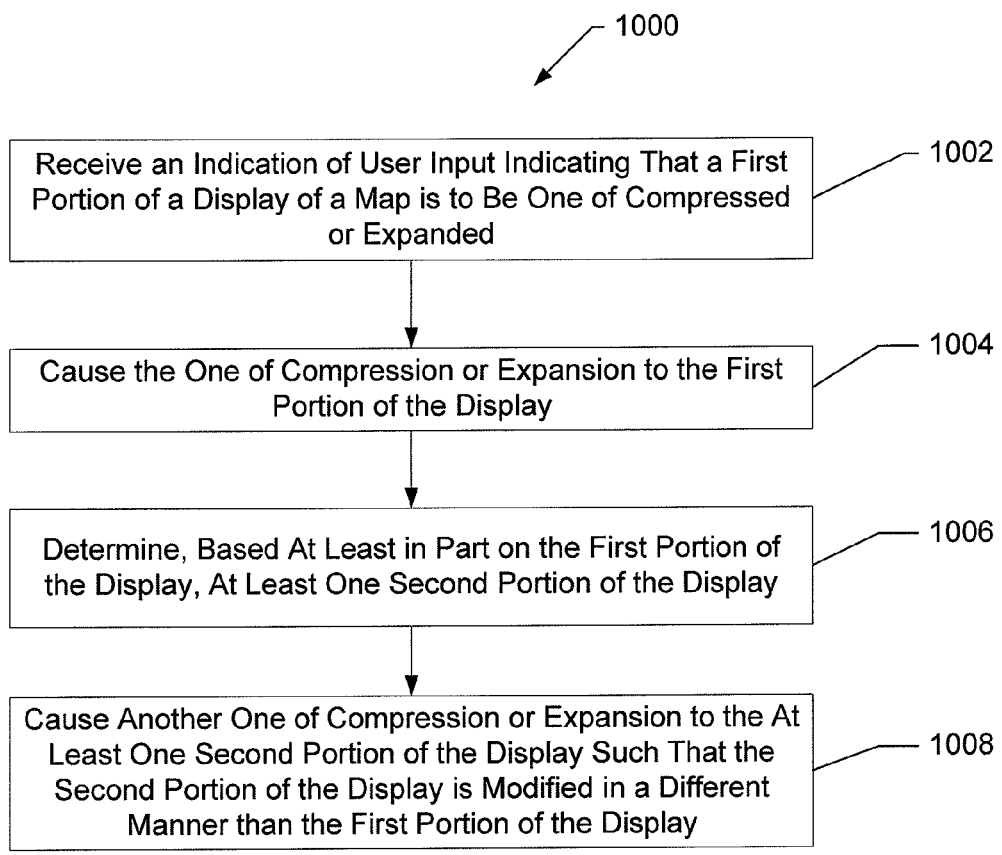
Figure 12:
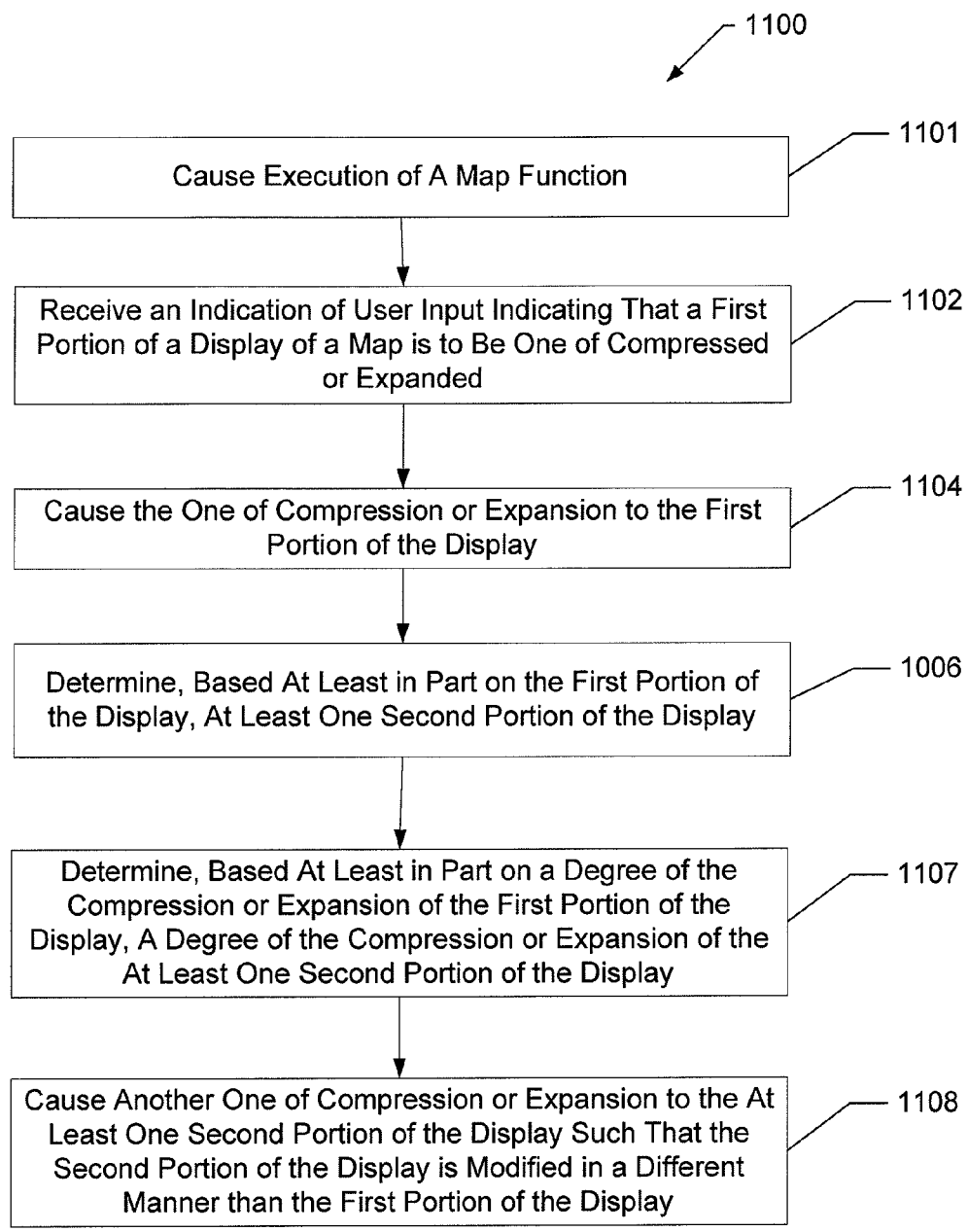
Figure 13:
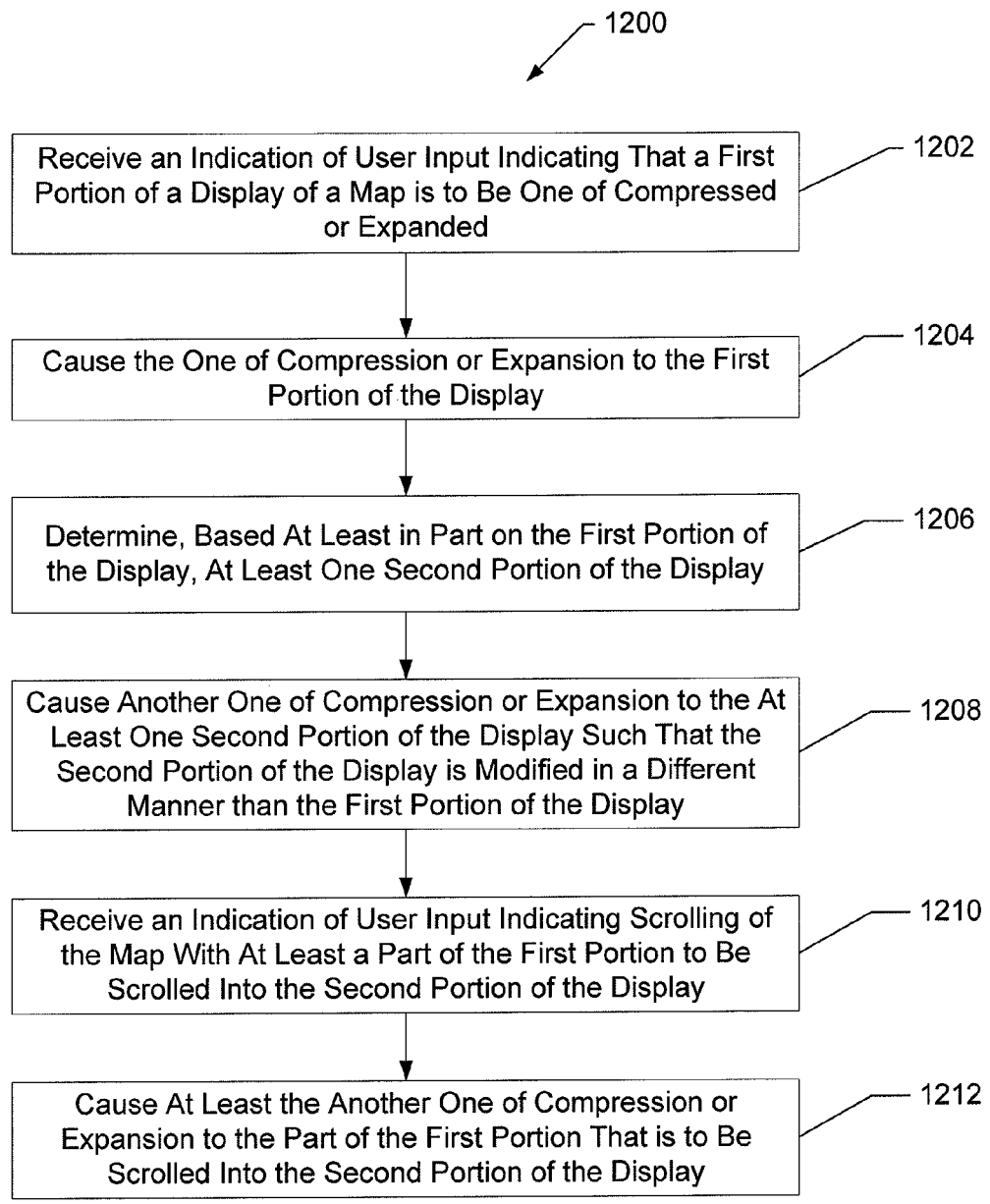
Figure 14:
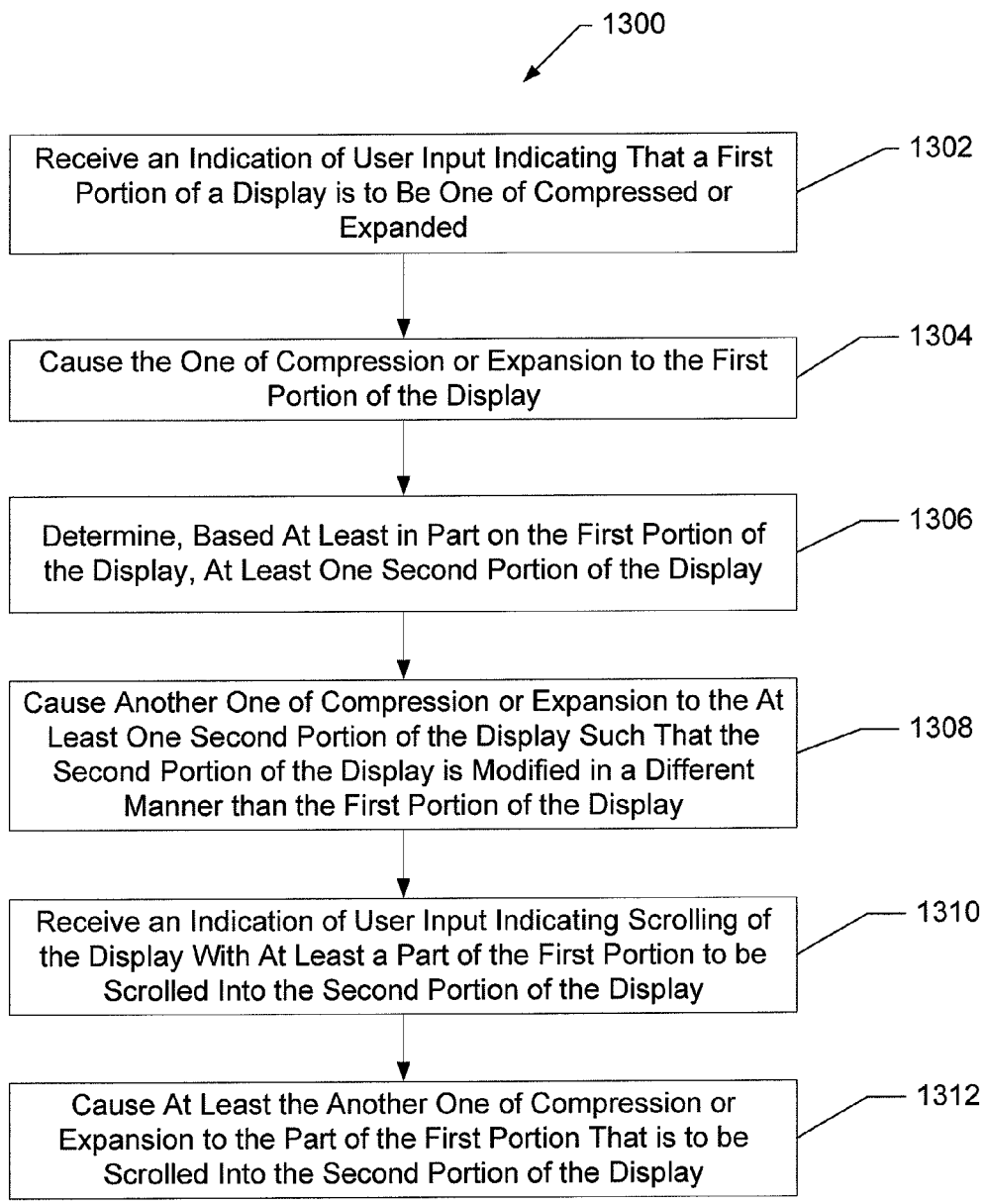

Having thus described embodiments of the invention in general terms, reference will now be made to the accompanying drawings, which are not necessarily drawn to scale, and wherein:

FIG. 1 illustrates a block diagram of an apparatus that controls a display according to an example embodiment;

FIG. 2 is a schematic block diagram of a mobile terminal according to an example embodiment;

FIGS. 3A-3D illustrate example user inputs (e.g., gestures) indicating a desired modification of displayed content, in accordance with example embodiments described herein;

FIGS. 4A-4B illustrate example user inputs (e.g., gestures) indicating a desired modification of content displayed on a device with an organic user interface, in accordance with example embodiments described herein;

FIGS. 5A-5C illustrate optimization of content displayed in a grid application, in accordance with example embodiments described herein;

FIGS. 6A-6C illustrate optimization of content displaying a panoramic downtown view, in accordance with example embodiments described herein;

FIGS. 7A-7C illustrate optimization of content displayed for a map application, in accordance with example embodiments described herein;

FIGS. 8A-8D illustrate optimization of content displayed for a file folder application, in accordance with example embodiments described herein;

FIGS. 9A-9B illustrate optimization of content displayed for a file folder application, wherein the content display includes multiple modifications, in accordance with example embodiments described herein;

FIGS. 10A-10C illustrate example scrolling features for optimized content displayed for a file folder application, in accordance with example embodiments described herein;

FIG. 11 illustrates a flowchart according to an example method for facilitating content display, in accordance with example embodiments described herein;

FIG. 12 illustrates a flowchart according to another example method for facilitating content display, in accordance with example embodiments described herein;

FIG. 13 illustrates a flowchart according to another example method for facilitating content display, in accordance with example embodiments described herein; and FIG. 14 illustrates a flowchart according to another example method for facilitating content display, in accordance with example embodiments described herein.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 for facilitating interaction with a user interface according to an example embodiment. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for facilitating interaction with a user interface, other configurations may also be used to implement embodiments of the present invention.

The apparatus 102 may be embodied as either a fixed device or a mobile device such as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In this regard, the apparatus 102 may comprise any computing device that comprises or is in operative communication with a touch display capable of displaying a graphical user interface. In some example embodiments, the apparatus 102 is embodied as a mobile computing device, such as the mobile terminal illustrated in FIG. 2.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the electronic device are illustrated and will be hereinafter described for purposes of example, other types of electronic devices, such as mobile telephones, mobile computers, personal digital assistants (PDAs), pagers, laptop computers, desktop computers, gaming devices, televisions, e-papers, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), and/or other input device. In embodiments including a keypad, the keypad may comprise numeric (0-9) and related keys (#, *), and/or other keys for operating the mobile terminal.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20 (shown in FIG. 2). In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42

(shown in FIG. 2). The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In embodiments wherein the apparatus 102 is embodied as a mobile terminal 10, the communication interface 114 may be embodied as or comprise the transmitter 14 and receiver 16 (shown in FIG. 2). The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. The communication interface 114 may additionally be in communication with the memory 112, user interface 116, and/or UI control circuitry 122, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the apparatus 102 is embodied as a mobile terminal 10, the user interface 116 may be embodied as or comprise the display 28 and keypad 30 (shown in FIG. 2). The user interface 116 may be in communication with the memory 112, communication interface 114, and/or UI control circuitry 122, such as via a bus. In some example embodiments, the user interface may comprise content display and touch display (e.g., a touch display user interface). As used herein for embodiments of the present invention, a "touch display" or "touch display user interface" may refer to either the entire touch display user interface or just the portion dedicated to user input.

The UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, or user interface 116, such as via a bus.

The UI control circuitry 122 may be configured to receive user input from a user interface 116, such as a touch display. The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display for which the user input correlates to.

The touch display may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a projected capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

The processor 110 and/or UI control circuitry 122 may be configured to receive an indication of user input indicating a desire to modify the display or at least a portion of the display (e.g., user interface 116). In some embodiments, such as in an instance when the user interface 116 comprises a touch display, the user input may be in the form of a gesture on or near the display. In some embodiments, the user input may indicate a desired modification, such as contracting/zooming out or expanding/zooming in. Other possible user inputs may include rotation, or similar manipulations of the display.

In some embodiments, the processor 110 and/or UI control circuitry 122 may be configured to receive an indication of user input for a specific portion of a display. In some embodiments, the display (e.g., user interface 116) may be configured such that a portion of the display can be defined by the user input (e.g., the user input may indicate a size and location of the portion of the display). As such, in some embodiments, the display may comprise a first portion defined by the user input and at least one or more other portions, such as a remaining portion of the display.

Additionally, in some embodiments, the processor 110 and/or UI control circuitry 122 may be configured to determine a second portion of the display different than the first portion defined by the user input. Determination of a second portion of the display by the processor 110 may be based upon a number of factors. In some embodiments, the processor 110 may determine the second portion of the display based at least in part on the user defined first portion. For example, a second portion of the display may be determined to be the remaining portion of the display, that is, all other portions of the display other than the first portion defined by the user input. In another example, the display may comprise multiple portions or distinguishing features (e.g., a split screen). In such embodiments, the processor 110 may determine the second portion based on both the user defined portion and the distinguishing features of the display. In another example, a user may define a first portion, such as an area around a destination on a map. In such an example embodiment, the processor 110 may be configured to determine a second portion outside of the user defined first portion (e.g., the area around the starting point, the area between the starting point and the final destination, etc.). Additionally, in some embodiments, the processor 110 may be configured to determine more than one portion of the display (e.g., a third portion, fourth portion, etc.) in addition to the user defined first portion.

Moreover, in some embodiments, the processor 110 may be configured to determine a portion inside the user defined first portion, or any other portion of the display. For example, a user may define a first portion and then may define and/or indicate another portion inside the first portion (e.g., perform a gesture around a small portion inside the first portion). In such a circumstance, the processor 110 may be further configured to determine the location of that gesture and define a portion inside the first portion for which that gesture applies (e.g., zooming in on that specific portion of the display, which in some cases, may be already zoomed in). Additionally, as will be explained in greater detail below, such a gesture may cause the processor 110 to determine another portion of the display. This other portion may be determined based at least in part upon the newly-user defined portion.

In some embodiments, the processor 110 and/or UI control circuitry 122 may be configured to receive an indication of user input that defines a specific portion of the display and indicates a desired modification of that portion of the display. Some examples of gestures are shown in FIGS. 3A, 3B, 3C, and 3D.

Figure 3A:
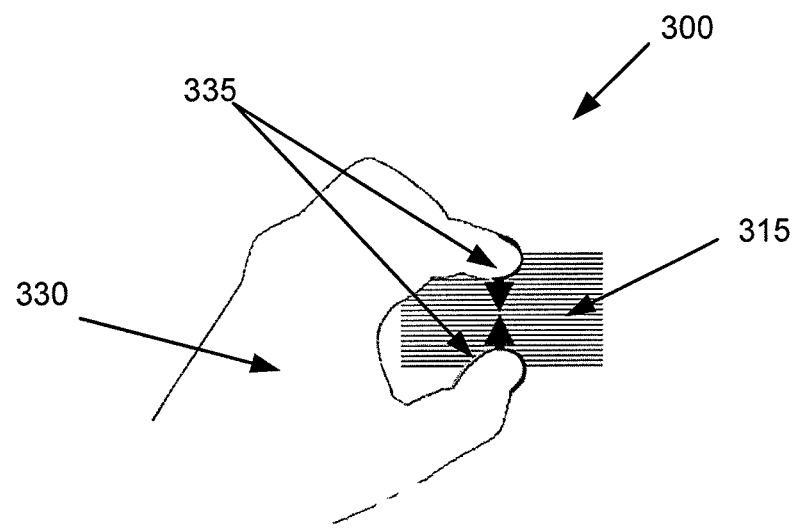

FIG. 3A illustrates an example user input 300 for modification of at least a portion of a display (e.g., user interface 116). In the depicted embodiment, a user 330 positions their fingers 335 on or near a portion of the display. The user's pointer finger defines the upper edge of the portion of the display 315 and the user's thumb defines the lower edge of the portion of the display 315. For contracting/compressing or zooming out the portion of the display (shown in FIG. 3A), the user 330 may bring their fingers 335 together (e.g., in a pinching motion). Based on the user input detected by the user interface 116, the processor 110 and/or UI control circuitry 122 may respond, contracting/zooming out on the portion of the display 315. In some embodiments, the user 330 may expand or zoom in on the portion of the display 315 by moving their fingers 335 further apart (e.g., widening their fingers).

Figure 3B:
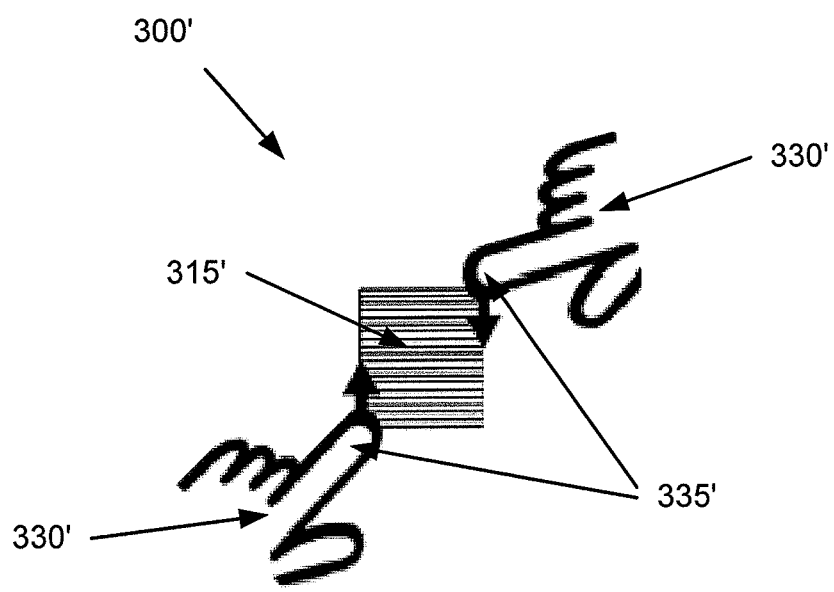

FIG. 3B illustrates another example user input 300' for modification of at least a portion of a display 315'. In the depicted embodiment, a user 330' positions their fingers 335' from separate hands on or near a portion of the display. The user's pointer finger of one hand defines one corner of the portion of the display 315' and the user's pointer finger of the other hand defines another corner (e.g., the diagonally opposite corner) of the portion of the display 315'. For contracting or zooming out (shown in FIG. 3B), the user 330' may bring their fingers 335' in a direction generally toward each other (e.g., along the edges of a rectangle that defines the desired portion of the display 315'). Based on the user input detected by the user interface 116, the processor 110 and/or UI control circuitry 122 may respond, contracting/zooming out on the portion of the display 315'. In some embodiments, the user 330' may expand or zoom in on the portion of the display 315' by moving their fingers 335' in a direction generally apart from each other (e.g., outwardly from the original position).

Figure 3C:
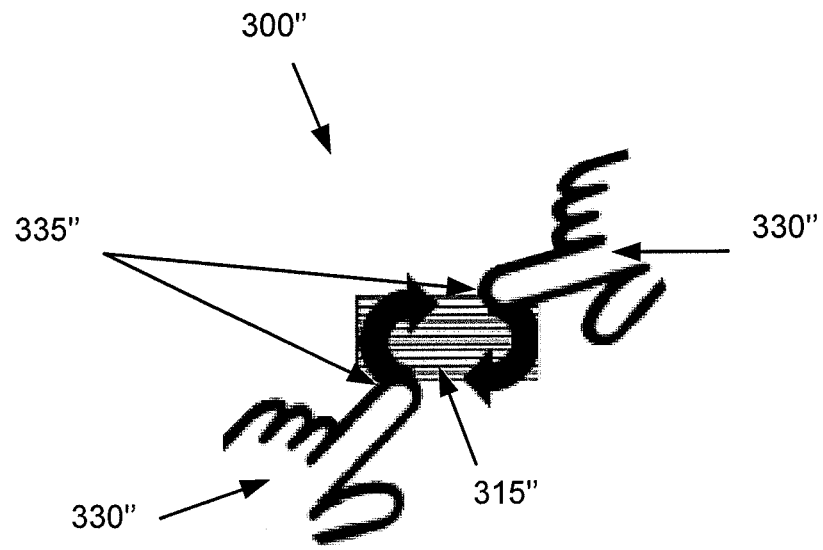

FIG. 3C illustrates another example user input 300" for modification of at least a portion of a display 315". In the depicted embodiment, a user 330" positions their fingers 335" from separate hands on or near a portion of the display. The user's pointer finger of one hand defines one corner of the portion of the display 315" and the user's pointer finger of the other hand defines another corner (e.g., the diagonally opposite corner) of the portion of the display 315". In the depicted embodiment, a user 330" may slide their fingers in an arc, such as rotating around the center of the portion of the display 315". This rotation gesture indicates a desire to rotate the portion of the display 315". Based on the user input detected by the user interface 116, the processor 110 and/or UI control circuitry 122 may respond, rotating the portion of the display 315".

Figure 3D:
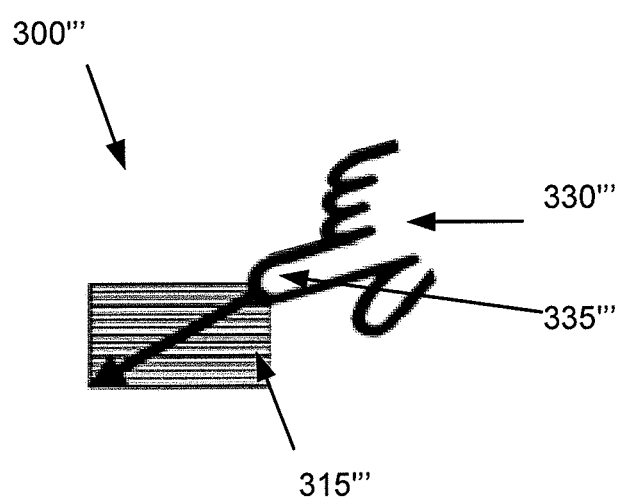

FIG. 3D illustrates yet another example user input 300''' for modification of at least a portion of a display (e.g., user interface 116). In the depicted embodiment, a user 330''' positions a finger 335''' on or near a portion of the display. The user's finger may define a corner of the portion of the display 315'''. For contracting or zooming out (shown in FIG. 3D), the user 330''' may slide their finger 335''' toward another corner of the portion of the display 315'''. Based on the user input detected by the user interface 116, the processor 110 and/or UI control circuitry 122 may respond, contracting/zooming out on the portion of the display 315'''. In some embodiments, the user 330''' may expand or zoom in on the portion of the display 315' by moving their finger 335' outwardly from the portion of the display.

In some embodiments, the user interface 116 may be configured with stretchable material. For example, the stretchable material may be elastic plastic that returns to its shape after it has been manipulated (e.g., stretched or wrinkled). In such a manner, the processor 110 and/or UI control circuitry 122 may be configured to receive user input in the form of manipulation of the user interface 116. For example, a user may squeeze or pinch together stretchable/bendable material to perform a gesture. Based on the user input detected by the user interface 116, the processor 110 and/or UI control circuitry 122 may in response, cause a modification of the display, based at least in part on the user input. In some embodiments, the user interface may comprise a transparent layer of stretchable material.

FIG. 4A illustrates an example of a user 430 performing a manipulation 400 of a device 410 comprising stretchable material. In the depicted embodiment, the display 415 is positioned on one side of the device 410. The user 430 may manipulate stretchable material on the backside of the device 410, such as by performing gestures (e.g., pinching and pulling) with the user's fingers 435.

FIG. 4B illustrates another example of a manipulation 450 of a device 460 comprising a stretchable material. In the depicted embodiment, the device 460 comprises a bendable form factor. As such, a user may bend the device 460 inward (e.g., toward the user) to define a compressed area 475, such as defined by the folding point and angle of the bend. Alternatively, a user may bend the device 460 outward (e.g., away form the user) to define an expanded area, such as defined by the folding point and angle of the bend.

Mobile computing devices, such as apparatus 102, often have a small form factor, leading to a small display. This may also be true with touch screen displays that offer limited space. In particular, size of the display is limited by the space available on the user interface 116 for the apparatus 102.

Embodiments of the present invention provide methods and apparatuses for optimizing or facilitating presentation of content on a display. In some embodiments, by compressing undesirable or less relevant visual space and/or content, a display may be expanded to optimize certain content that may be more desirable or relevant to the user. For example, embodiments of the present invention allow for a region of interest to be expanded (e.g., zoomed in on) while automatically compressing (e.g., zooming out) of the other regions. Moreover, in some embodiments, multiple compressed and/or expanded content areas may be present allowing for a fully customizable display for a user. Additionally, in some embodiments, a user may scroll between previously modified content on display.

The processor 110 and/or UI control circuitry 122 may be configured to cause a modification to the display (e.g., user interface 116). In some embodiments, the processor 110 and/or UI control circuitry 122 may be configured to apply a modification to a portion of the display, such as a portion designated by the user from user input. The modification may be any type of change to the display or portion of the display. For example, the modification may include re-scaling the size of the display or portion of the display (e.g., contracting/compressing or expanding). Likewise, the modification may include zooming in or zooming out on the display or portion of the display. In some embodiments, the modification may include movement of the content inside the display (e.g., rotation, displacement, etc.). As such, embodiments of the present invention may be useful with any type of manipulation to the content and/or display (or portion of the display).

As noted above, the display size may be limited by the form factor of the apparatus 102. Thus, similarly, in some embodiments, modification of the display may also depend on space available on the apparatus 102. For example, the available space of the display may limit/determine the scale or degree of the modification of the content/display.

The processor 110 and/or UI control circuitry 122 may be further configured to cause a modification to the display (e.g., user interface 116) in response to the processor 110 receiving user input, such as user input indicating a modification to at least a portion of the display. Additionally or alternatively, the processor 110 and/or UI control circuitry 122 may determine an appropriate modification for the content/display based on the user input. In such a regard, modification of the display (or portion of the display) may be based at least in part on the user input. For example, a user may perform a gesture indicating zooming in, and the processor 110 may receive the user input, and in response, determine that the desired modification includes at least expanding the scale of the display (or portion of the display) in relation to the degree of zooming in indicated by the user input. Likewise, the processor 110 and/or UI control circuitry 122 may be configured to contract/compress the scale of the display (or portion of the display) in relation to a degree of zooming out indication from user input. In such a regard, the processor 110 and/or UI control circuitry 122 may be configured to cause a modification to at least a portion of the display that is proportional to the received user input. Additionally, in some embodiments, the determination of the appropriate modification to apply may include determination of the degree of modification to apply (e.g., how much to expand or compress the display or portion of the display).

The processor 110 and/or UI control circuitry 122 may be configured to cause a modification to a portion of the display (e.g., user interface 116) in response to the processor 110 receiving user input, such as user input indicating a modification to the portion of the display. In such a regard, the processor 110 and/or UI control circuitry 122 may determine the appropriate portion of the display to apply the modification to based on the user input, that is, the user input defining the portion of the display to be modified. In some embodiments, this portion is referred to as the first portion of the display.

In some embodiments, the user input (e.g., gesture) may define the portion of the display while also indicating the desired modification to be applied. For example, a user input that includes positioning two fingers on or near the display and pinching them together indicates both a desire to contract or zoom out the content and the desired portion of the display of which to apply the modification (e.g., between the two fingers). As such, in some embodiments, the processor 110 may determine the portion to apply the modification to based at least in part on the indicated portion from the user input.

Applying a modification to the first portion of a display may, however, in some embodiments, leave additional unused space after the modification is applied. For example, if a processor 110 and/or UI control circuitry 122 causes compression of a portion of a display, additional space will remain on the display that does not have content. On the other hand, if the processor 110 and/or UI control circuitry 122 causes an expansion to a portion of the display, the expansion will likely overtake already displayed content.

The processor 110 may be configured to determine this additional unused space or overtaken currently used space. In some embodiments, the processor 110 may be configured to determine, based at least in part on the first portion that has been defined by the user input, a second portion of the display. The second portion of the display may, in some embodiments, comprise at least a portion of the additional unused space or overtaken currently used space. In other embodiments, the second portion may comprise portions of the display which were not affected by the modification to the first portion. As such, a number of factors may be considered in determination of the second portion of the display (e.g., size of the first portion, distinguishing features, split screen, other defined portions, etc.). For example, a display of content may be already split into two portions, such as for two different applications or two types of views for the same application (e.g., a map on one half of the display and a list of directions on the other half). A user may indicate a portion of the map to be enlarged, such as the destination. In one example, the processor may determine that the indicated area should be enlarged and the remainder of only the map portion should be compressed to account for the enlarged destination. This would not modify the portion of the display dedicated to the directions. On the other hand, however, the processor may determine that a portion of the directions should be slightly compressed along with the remainder of the map, allowing for an even greater portion of the display to be dedicated to the destination. In such examples, the processor is accounting for both the space taken up by the expanding user defined portion and the distinguishing feature of the directions list.

In another non-limiting example, the processor 110 may be configured to determine that the second portion comprises the remaining portion of the display after modification to the first portion has occurred. Additionally, in some embodiments, the processor 110 may be configured to divide the remaining portion of the display after the modification of the first portion into multiple portions (e.g., a second portion, third portion, etc.). Moreover, in some embodiments, the processor 110 may be configured to determine more than one second portion of the display, such as to apply the second modification as described herein.

The processor 110 and/or UI control circuitry 122 may be configured to cause a modification to the second portion of the display. Moreover, in some embodiments, the processor 110 may be configured to determine the modification to apply to the second portion, such as by determining the degree of modification to apply (e.g., how much to expand or compress the display or portion of the display). As referred to herein, the modification to the second portion may be referred to as a second modification, as the modification to the first portion may be referred to as a first modification.

As such, in some embodiments, the processor 110 may be configured to determine, based at least in part on the first modification, the second modification. Additionally or alternatively, in some embodiments, this determination may depend on a number of factors (e.g., available space, user preferences, type of application being run, etc.). In some embodiments, the processor 110 may be configured to determine and cause more than one second modification to the determined one or more second portions of the display.

In some embodiments, the processor 110 and/or UI control circuitry 122 may be configured to determine and/or cause a second modification to the second portion of the display, such that the second portion is modified in a different manner than the first portion of the display. Moreover, in some embodiments, the second modification may be such that the second portion is modified in an opposite manner to the first modification. As such, do example second modification may be compressing the second portion of the display in an instance in which the first modification comprises expanding the first portion of the display. Likewise, another example second modification comprises expanding the second portion of the display in an instance in which the first modification comprises contracting the first portion of the display.

As is consistent with the disclosure herein, the processor 110 and/or UI control circuitry 122 may be configured to automatically determine portions of the display, determine modifications, and/or cause modifications in the display (e.g., user interface 116). For example, once a user provides user input indicating a first modification to a first portion of the display, some embodiments of the present invention may comprise automatically determining the desired first portion and first modification, causing the first modification and, then, subsequently or concurrently determining the at least one second portion of the display and second modification and causing the modification to the at least one second portion of the display.

As noted herein, some embodiments of the present invention seek to facilitate display of desired content while limiting display of less desired content. As such, for some embodiments, more than one portion of the display may be modified. Moreover, the applied modification may differ for each determined portion. As such, numerous combinations of determined portions and determined modifications exist in embodiments of the present invention.

Likewise, in some embodiments, the processor 110 and/or UI control circuitry 122 may be configured to cause modification to any of the content on display (e.g., including the recently modified content). For example, while a user can perform multiple gestures to define different portions of the display and different modifications for those portions, a user may also perform a gesture to a previously modified portion, which may cause the previous modification of the portion to be reversed. An example of this reversal, is de-compressing (e.g., expanding) a previously compressed portion of the display. As such, embodiments of the present invention provide methods and apparatuses for dynamic customization of content display on a user interface.

FIGS. 5A, 5B, and 5C illustrate an example embodiment of the present invention applied to a grid display. In the depicted embodiment of FIG. 5A, a user interface 500 displays a grid with boxes 550 and numbers 540. A user 530 may perform a gesture 510 by pointing two fingers at the display and bringing their fingers together (e.g., pinching). In the depicted embodiment, the user 530 has positioned their fingers on boxes that generally correspond to numbers "3, 4, 5, 6, and 7."

The processor, as noted above, may receive the user input (e.g., pinching gesture 510) and in response cause modification of the selected portion of the display. For example, with reference to FIG. 5B, the processor may cause the boxes 555 that correspond to the selected numbers 545 (e.g., numbers 3, 4, 5, 6, and 7), to be compressed (e.g., contracted/zoomed out). Thus, the same content is now displayed in less of a space on the display 500. However, the boxes 550 of the remaining portion of the grid remain the same size, causing empty or unused space 512 to appear on the display (e.g., above and below the grid).

This empty or unused space 512 may be filled by a second modification to optimize the remaining content of the display. For example, with reference to FIG. 5C, the boxes 558 and corresponding numbers 548 (e.g., 1, 2, 8, and 9) above and below the compressed boxes 555 and numbers 545 (e.g., 3, 4, 5, 6, and 7), may be expanded (e.g., zoomed in) to fill the empty space 512 (shown in FIG. 5B). In such a manner, boxes 558 and numbers 548 are easier to see and the content display is optimized. Though FIG. 5B illustrates a display with unused space 512 and the description above denotes a second modification occurs after the first modification, both modifications may occur concurrently (or close enough in time) such that the user is not aware of (or does not see) the unused space or a later modification. For example, the user may see both modifications being applied at the same time such that the display appears to always contain some content.

Similarly, FIGS. 6A, 6B, and 6C illustrate another example embodiment of the present invention applied to a panoramic view of a downtown display. The panoramic image may be a presentation of 2D or 3D map objects, or a digital image such as a digital photograph. In the depicted embodiment of FIG. 6A, a user interface 620 may display a panoramic view of a downtown, such as the downtown view 610. FIG. 6B illustrates a user 630 performing a gesture 615 (e.g., pinching) causing compression of a portion 640 of the downtown view 610. The visual presentation of the compressed portion 640 may be based on visually squeezing the compressed part of the downtown display. Similar to the grid display illustrated in FIGS. 5A, 5B, and 5C, the user interface 620 may include unused space, since a portion 640 of the downtown view 610 has been compressed while the remainder stays the same size. As noted above, the processor may determine at least one second portion of the downtown view and cause a modification to that portion. For example, with reference to FIG. 6C, the processor may determine that an expansion modification to portions 650 of the downtown view 610 may be appropriate to optimize the content in the user interface 620. As such, the processor may apply the expansion modification to the portions 650 of the downtown view 610, causing the user interface 620 to fill up with the downtown view 610. In such a manner, the images of the buildings in portions 650 are now optimized (e.g., zoomed in on).

In some embodiments, the apparatus 102 may be configured to execute a map function. For example, the processor 110 may be configured to cause a map to be displayed on the user interface 116. In some embodiments, principles for compressing less desirable content in favor of expanding more desirable content may be applied to a map function. Such an application may be useful for displaying directions on a map. For example, often directions follow long interstates or highways causing the specific streets off the interstate or highway to remain small and difficult to see even though a user may require more direction on the surface street than while moving along an interstate or highway. Along these lines, it may be desirable to see the starting point of the trip zoomed in (e.g., the streets leading to the interstate) and also see the final destination of the trip zoomed in (e.g., the streets off the interstate to the destination). Additionally, the distance traveled on the interstate may be less important. As such, the visual space dedicated to the distance on the interstate may be ideal for compression, especially in favor of expansion of the visual space dedicated to the starting point and/or destination.

FIGS. 7A, 7B, and 7C illustrate an example embodiment of the present invention applied to a map display. In the depicted embodiment of FIG. 7A, a user interface 700 displays a map. In particular, the display also shows a route 725 for the user to follow. The route 725 has a starting point 712 and a destination 714. In between the starting point 712 and destination 714 is a relatively long stretch of highway (e.g., the stretch of highway extending through portion 720 of the map).

Should a user wish to expand the display of the starting point 712 and the destination 714, a user may perform a compression gesture (e.g., pinching) in between the starting point 712 and destination 714. For example, FIG. 7B illustrates a user 730 performing a contracting gesture to effect compression of less desirable content (e.g., the stretch of highway through portion 720) and expansion of more desirable content (e.g., starting point 712 and destination 714). In the depicted embodiment, the user 730 positions their thumb at the beginning of the portion of the display for which they wish to be compressed (e.g., point 742) and their pointer finger at the end of the portion of the display for which they wish to be compressed (e.g., point 742'). The user 730 may then pinch their thumb and finger together, such as toward points 744 and 744', respectively. Such a gesture 740 indicates a desire to apply a first modification to the portion 720 of the map 700.

The processor receives this indication (e.g., user input 740) and causes portion 720 (shown in FIG. 7B) to appear compressed, such as shown by portion 720' in FIG. 7C (e.g., shown by the arrows on the display). In some embodiments, an indication (e.g., arrows) may be presented on the user interface, to indicate to the user that content underneath the indication has been compressed. In addition to compressing portion 720 (FIG. 7B) of the display to become compression portion 720', the processor has also caused expansion of the map for the other portions of the display, that is, for those portions around the starting point 712 and the destination 714. The distinction between the previous map view (FIG. 7B) and the modified map view (FIG. 7C) is shown in the difference of the map scale. For example, FIG. 7B, before modification, shows a map scale 760 of 1:200 (e.g., 1 centimeter is equivalent to 200 meters), while FIG. 7C, after modification, shows a map scale 762 of 1:50 (e.g., 1 centimeter is equivalent to 50 meters). As such, it is clear that the portions surrounding the starting point 712 and destination 714 are zoomed in. This zooming in is a form of optimization of the more desirable content for the user interface 700. The physical length or temporal duration of the pinching gesture on the display may define the scale of compression. Although not shown in FIG. 7C, the map scales on the left and right side of the display may be different in order to optimize content display.

In some embodiments, the processor 110 and/or UI control circuitry 122 may be configured to cause additional modifications to the display of content. In some circumstances, such modifications may change the way all of the content is displayed on the user interface 116.

FIGS. 8A, 8B, 8C, and 8D illustrate an example of causing an additional and/or different modification to the display of the content in response to a user input indicating a first modification to a first portion of the display. Such example embodiments display the dynamic capabilities of the processor, such as the ability to determine an appropriate portion of the display to modify as well as an appropriate modification to apply.

Figure 8A:
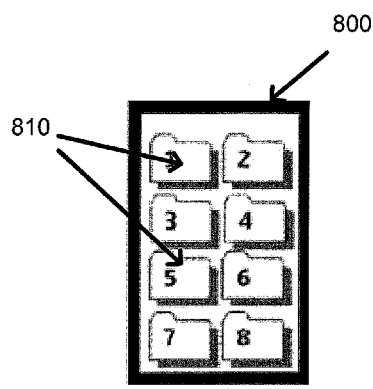
Figure 8B:
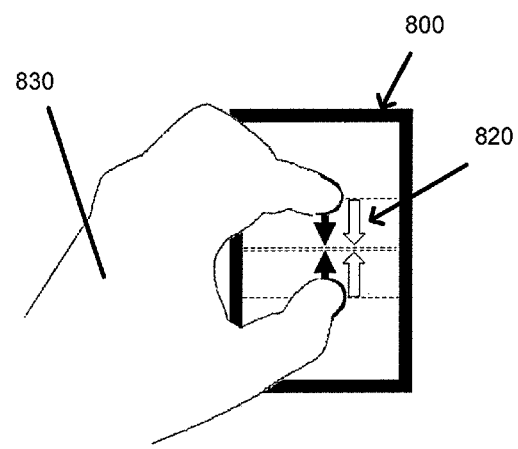
Figure 8C:
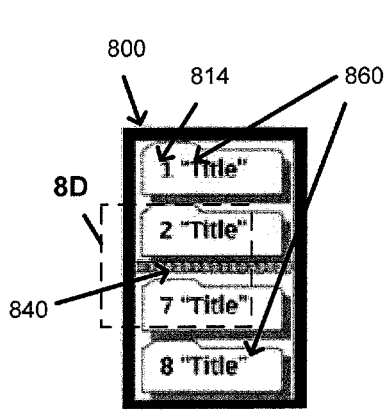
Figure 8D:
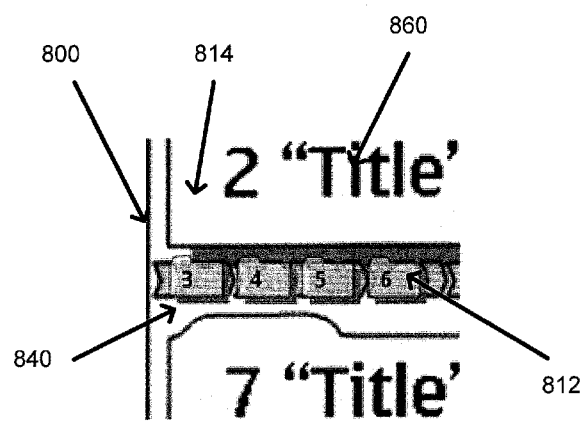

In the depicted embodiment, a user interface 800 may display a number of file folders 810 (shown in FIG. 8A). With reference to FIG. 8B, a user 830 may perform a gesture 820 on or near the display. In the depicted embodiment, the user 830 performs a compressing gesture (e.g., pinching) focused on a portion of the display showing file folders 3, 4, 5, and 6.

The processor may be configured to receive the user input and cause a modification of file folders 3-6. However, when determining what modification (e.g., first modification) to apply to folders 3-6 (e.g., the first portion) and what modification (e.g., second modification) to apply to the remaining folders 1, 2, 7, and 8 (e.g., the second portion), the processor may take into consideration the way the content is displayed. For example, with reference to FIG. 8C, the processor may change the position and horizontal length of the remaining file folders 814 (e.g., file folders 1, 2, 7, and 8) in order to expand into the space vacated by the compression of folders 3-6. Moreover, the processor may be configured to determine that additional content display space is available and, thus, may determine that additional previously undisplayed content may now be displayed. For example, in the depicted embodiment, the processor has displayed text 860 (e.g., "Title") in the newly modified remaining file folders 814.

Additionally or alternatively, the processor may be configured to change the display of the user selected (and compressed) file folders. For example, with reference to FIG. 8D, which is an enlarged view of a portion of the user interface 800 of FIG. 8C, the selected file folders 812 that were compressed may be scaled down in size and realigned such as along a compression zone 840. In some embodiments, the compression zone 840 may relate to the original position of the file folders 812, such as being positioned between file folders 1 and 2 and file folders 7 and 8.

As noted above, embodiments of the present invention provide for customized content display on a user interface. Thus, in some embodiments, the processor 110 and/or UI control circuitry 122 may be configured to apply modification to additional portions of a display that may have already been modified. FIGS. 9A and 9B illustrate an example user interface 900 with multiple compressed zones after at least two user inputs (e.g., gestures).

With reference to FIG. 9A, a user interface 900 may display a number of file folders 910. A user 930 may make a first gesture 920 indicating a desire to compress a first portion 912 of the display (e.g., file folders 4-9). This gesture 920 may be performed by a user 930 placing their thumb on line 924 and their pointer finger on line 926 defining the outer bounds of the first portion 912. The user 930 may perform the gesture 920 by pinching their thumb and finger together.

Additionally, in the depicted embodiment, the user 930 also performs a second gesture 940 indicating a desire to compress a second portion 913 of the display (e.g., file folders 13-18). This gesture 940 may be performed by a user 930 placing their thumb on line 944 and their pointer finger on line 946 defining the outer bounds of the first portion 913. The user 930 may perform the gesture 940 by pinching their thumb and finger together.

The processor of the device 900 may then cause modification of the content on display to occur (shown in FIG. 9B). This modification may be based on the received indication from the user input. For example, the first portion 912 may be compressed and displayed as the first compressed zone 922. The second portion 913 may also be compressed and displayed as the second compression zone 942. Additionally, the file folders 910 that were not compressed (e.g., 1, 2, 3, 10, 11, and 12) may be optimized for content display. For example, the file folders may be enlarged (e.g., file folder 914). Additionally, text 960 may be added to the file folder for further optimization. Though the modification shown in FIG. 9B is performed after both user inputs, in some embodiments, the processor may be configured to compress the undesired portion and optimize the remaining portion directly after the first user input and before performing a set of subsequent modifications in response to the second user input.

While optimization of currently displayed content is beneficial, some embodiments of the present invention may provide methods and apparatuses for scrolling through the modified content. The original display prior to modification may allow for scrolling by easy movement of content from one side of the display to the next, or in some cases, from off the display to onto the display forcing currently displayed content off the other side of the display. Additional considerations, however, must be accounted for with the modified content.

As such, the processor 110 and/or UI control circuitry 122 may be configured to enable scrolling of content between differently modified portions of the display. In some embodiments, the processor 110 may be configured to receive an indication of user input indicating scrolling on the display from one portion of the display to another. The processor 110 may also be configured to determine the portion of the content to which the user is now referring. Additionally, the processor 110 may be configured to determine the appropriate modification to apply to that portion so as to maintain the desired modifications currently presented on the display. Moreover, in some embodiments, the processor 110 may be configured to determine another portion of the display and to determine the appropriate modification to apply to that portion in response to the user input.

As noted above, determination of the modification to apply may be based on the degree of modification applied to other portions of the display. For example, the processor 110 may receive an indication of user input indicating scrolling of the map from an already modified first portion of the display to an already modified second portion of the display. In response, the processor 110 may cause at least one modification (e.g., compression, expansion, etc.) of at least a portion of the first portion of the display (e.g., the portion indicated by the user input). Then, the processor 110 may determine the degree of modification (e.g., compression, expansion, etc.) to perform on that portion of the first portion of the display. In some embodiments, that degree of modification may be based in part on a degree of modification already applied to the first portion of the display and a degree of the modification already applied to the second portion of the display. For example, if the processor were displaying a map with a compressed zone and the user performed a scrolling gesture from the compressed zone to the expanded zone, the processor could determine the portion of the compressed zone for which to scroll to the expanded zone. Then, the processor could apply a reverse modification (relative to the original modification) to the compressed zone (e.g., returning the content to original form) that scrolled into the expanded zone. Next, the processor could apply the same modification to the portion of the formerly compressed zone that was scrolled into the expansion zone or the modification previously applied to the expanded zone, thereby causing that portion to be expanded so as to appear correctly in the expanded zone. This same concept may be applied throughout the display to effect the proper scrolling, including causing content to be "moved" off the display. Likewise, content may be scrolled from the expanded zone into the compressed zone, such as by performing modifications to the scrolled portion that would compress the content to the degree of the compressed zone.

FIGS. 10A, 10B, and 10C illustrate example embodiments of scrolling on an optimized display. With reference to FIG. 10A, a user 830 may perform a scrolling gesture 890 on a user interface 800 that has been optimized according to example embodiments described herein (e.g., the optimized user interface 800 of FIG. 8C). In the depicted embodiment, the optimized display 800 includes a compressed zone 840 containing file folders 3, 4, 5, and 6, and four expanded file folders 1, 2, 7, and 8. The expanded file folders 814 may be arranged in a general location consistent with the original content display (e.g., the content display before modification).

In the depicted embodiment, the scrolling gesture 890 includes a user 830 positioning a finger on or near file folder 7 at point 892. Then, the user moves (e.g., flicks, sweeps, etc.) his finger upwards, such as over the compressed zone 840. Once the scrolling gesture 890 is performed, the processor 110 may effect scrolling on the display in a number of different ways.

In one example embodiment in which compression and expansion zones remain fixed in position and content scrolls through them, with reference to FIG. 10B, file folder 7 (887) may be modified and moved into the compression zone 840. Then, file folder 3 (883) may be modified and moved into the expanded zone, above the compression zone 840. Moreover, to make room on the display for file folder 3 (883), file folder 1 may be moved off the display (e.g., removed from display). Likewise, file folder 8 (888) may be moved toward the compression zone 840. In some embodiments, the unused space below file folder 8 (888) may be replaced with additional content (e.g., file folder 9).

In one example embodiment in which content remains in the same size but may be reordered to remain in an appropriate zone (e.g., expanded contend in an expanded zone and compressed content in a compressed zone), with reference to FIG. 10C, file folder 7 (887) may be expanded and, in response to upward scrolling, may be moved through or jumped over the compression zone 840 so as to remain within an expanded zone. Moreover, to make room on the display for file folder 7 (887), file folder 2 (882) may be moved up on the display and file folder 1 may be moved off the display (e.g., removed from display). Then, file folder 8 (888) may be moved toward the compression zone 840. In some embodiments, the unused space below file folder 8 (888) may be replaced with additional content (e.g., file folder 9). In such an embodiment, content can be shifted on the screen without spatial relationships between the content remaining in tact, allowing for additional customization of the content display.

Though FIGS. 10A, 10B, and 10C, illustrate scrolling in a file folder display, this same concept may also be applied to a map function, such as may be consistent with the description provided with reference to FIGS. 7A, 7B, and 7C. For example, in some embodiments in which compression and expansion zone remain fixed and content is scrolled through, with reference to FIG. 7C, a user could scroll the map to the left (e.g., flick it to the right). In response, the currently visible area near the destination 714 would move beneath the compressed zone 720 and an area currently under the compressed zone 720 (e.g., an area near the starting point 712) would appear on the left side of the compressed zone 720. In such a manner, the left portion of the display may show an area near the starting point 712, but further along the path 725.

While example embodiments of the present invention have been described with respect to grids, panoramic views, maps, and file folder displays, such descriptions are not meant to limit applications of the present invention. For example, some embodiments may be used with web applications, "Back History" menus for websites, inventory lists, semantic zoom functions, or any form of display on a user interface.

Embodiments of the present invention provide an ability to manipulate and customize content display. Such manipulation may be ideal for user interfaces with small displays (e.g., mobile computing devices). Additionally, scrolling of maps or other displays can be easier and more effective, displaying more desired content.

Embodiments of the present invention provide methods, apparatus and computer program products for compressing and expanding visual space to facilitate the presentation of desired information on a display. Various examples of the operations performed in accordance with embodiments of the present invention will now be provided with reference to FIGS. 11-14.

FIG. 11 illustrates a flowchart according to an example method for optimizing the presentation of content on a display according to an example embodiment 1000. The operations illustrated in and described with respect to FIG. 11 may, for example, be performed by, with the assistance of, and/or under the control of one or more of the processor 110, memory 112, communication interface 114, user interface 116, or UI control circuitry 122. Operation 1002 may comprise receiving an indication of user input indicating that a first portion of the display of a map is to be one of compressed or expanded. The processor 110, user interface 116, and/or UI control circuitry 122 may, for example, provide means for performing operation 1002. Operation 1004 may comprise causing the one of compression or expansion to the first portion of the display. The processor 110, user interface 116, and/or UI control circuitry 122 may, for example, provide means for performing operation 1004. Operation 1006 may comprise determining, based at least in part on the first portion of the display, at least one second portion of the display. The processor 110, user interface 116, and/or UI control circuitry 122 may, for example, provide means for performing operation 1006. Operation 1008 may comprise causing another one of compression or expansion to the at least one second portion of the display such that the second portion of the display is modified in a different manner than the first portion of the display. The processor 110, user interface 116, and/or UI control circuitry 122 may, for example, provide means for performing operation 1008.

FIG. 12 illustrates a flowchart according to another example method for optimizing the presentation of content on a display according to an example embodiment 1100. The operations illustrated in and described with respect to FIG. 12 may, for example, be performed by, with the assistance of, and/or under the control of one or more of the processor 110, memory 112, communication interface 114, user interface 116, or UI control circuitry 122. Operation 1101 may comprise causing execution of a map function. The processor 110, user interface 116, and/or UI control circuitry 122 may, for example, provide means for performing operation 1101. Operation 1102 may comprise receiving an indication of user input indicating that a first portion of the display of a map is to be one of compressed or expanded. The processor 110, user interface 116, and/or UI control circuitry 122 may, for example, provide means for performing operation 1102. Operation 1104 may comprise causing the one of compression or expansion to the first portion of the display. The processor 110, user interface 116, and/or UI control circuitry 122 may, for example, provide means for performing operation 1104. Operation 1106 may comprise determining, based at least in part on the first portion of the display, at least one second portion of the display. The processor 110, user interface 116, and/or UI control circuitry 122 may, for example, provide means for performing operation 1106. Operation 1107 may comprise determining, based at least in part on a degree of the compression or expansion of the first portion of the display, a degree of the compression or expansion of the at least one second portion of the display. The processor 110, user interface 116, and/or UI control circuitry 122 may, for example, provide means for performing operation 1107. Operation 1108 may comprise causing another one of compression or expansion to the at least one second portion of the display such that the second portion of the display is modified in a different manner than the first portion of the display. The processor 110, user interface 116, and/or UI control circuitry 122 may, for example, provide means for performing operation 1108.

FIG. 13 illustrates a flowchart according to another example method for optimizing the presentation of content on a display according to an example embodiment 1200. The operations illustrated in and described with respect to FIG. 13 may, for example, be performed by, with the assistance of, and/or under the control of one or more of the processor 110, memory 112, communication interface 114, user interface 116, or UI control circuitry 122. Operation 1202 may comprise receiving an indication of user input indicating that a first portion of the display of a map is to be one of compressed or expanded. The processor 110, user interface 116, and/or UI control circuitry 122 may, for example, provide means for performing operation 1202. Operation 1204 may comprise causing the one of compression or expansion to the first portion of the display. The processor 110, user interface 116, and/or UI control circuitry 122 may, for example, provide means for performing operation 1204. Operation 1206 may comprise determining, based at least in part on the first portion of the display, at least one second portion of the display. The processor 110, user interface 116, and/or UI control circuitry 122 may, for example, provide means for performing operation 1206. Operation 1208 may comprise causing another one of compression or expansion to the at least one second portion of the display such that the second portion of the display is modified in a different manner than the first portion of the display. The processor 110, user interface 116, and/or UI control circuitry 122 may, for example, provide means for performing operation 1208.

In the depicted embodiment, a scrolling feature may be offered for the optimized content display. As such, Operation 1210 may comprise receiving an indication of user input indicating scrolling of the map with at least a part of the first portion to be scrolled into the second portion of the display. The processor 110, user interface 116, and/or UI control circuitry 122 may, for example, provide means for performing operation 1210. Operation 1212 may comprise causing at least the another one of compression or expansion to the part of the first portion that is to be scrolled into the second portion of the display. The processor 110, user interface 116, and/or UI control circuitry 122 may, for example, provide means for performing operation 1212.

FIG. 14 illustrates a flowchart according to an example method for optimizing the presentation of content on a display according to an example embodiment 1300. The operations illustrated in and described with respect to FIG. 14 may, for example, be performed by, with the assistance of, and/or under the control of one or more of the processor 110, memory 112, communication interface 114, user interface 116, or UI control circuitry 122. Operation 1302 may comprise receiving an indication of user input indicating that a first portion of the display is to be one of compressed or expanded. The processor 110, user interface 116, and/or UI control circuitry 122 may, for example, provide means for performing operation 1302. Operation 1304 may comprise causing the one of compression or expansion to the first portion of the display. The processor 110, user interface 116, and/or UI control circuitry 122 may, for example, provide means for performing operation 1304. Operation 1306 may comprise determining, based at least in part on the first portion of the display, at least one second portion of the display. The processor 110, user interface 116, and/or UI control circuitry 122 may, for example, provide means for performing operation 1306. Operation 1308 may comprise causing another one of compression or expansion to the at least one second portion of the display such that the second portion of the display is modified in a different manner than the first portion of the display. The processor 110, user interface 116, and/or UI control circuitry 122 may, for example, provide means for performing operation 1308.

In the some embodiments, such as shown in the depicted embodiment, a scrolling feature may be offered for the optimized content display. As such, Operation 1310 may comprise receiving an indication of user input indicating scrolling of the display with at least a part of the first portion to be scrolled into the second portion of the display. The processor 110, user interface 116, and/or UI control circuitry 122 may, for example, provide means for performing operation 1310. Operation 1312 may comprise causing at least the another one of compression or expansion to the part of the first portion that is to be scrolled into the second portion of the display. The processor 110, user interface 116, and/or UI control circuitry 122 may, for example, provide means for performing operation 1312.

FIGS. 11-14 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
receiving user input defining a first portion of a display of a map and indicating selection of one of compression or expansion to apply to the first portion of the display;
causing, by a processor, the one of compression or expansion to the first portion of the display;
determining, based at least in part on the first portion of the display, at least one second portion of the display; and
causing another one of compression or expansion to the at least one second portion of the display such that the second portion of the display is modified in an opposite manner to the first portion of the display.

2. The method of claim 1 further comprising determining, based at least in part on a degree of the compression or expansion of the first portion of the display, a degree of the compression or expansion of the at least one second portion of the display.

3. The method of claim 1, wherein causing another one of compression or expansion to the at least one second portion of the display comprises compressing the at least one second portion of the display in an instance in which causing the one of compression or expansion to the first portion of the display comprises expanding the first portion of the display.

4. The method of claim 1, wherein causing another one of compression or expansion to the at least one second portion of the display comprises expanding the at least one second portion of the display in an instance in which causing the one of compression or expansion to the first portion of the display comprises compressing the first portion of the display.

5. The method of claim 1 further comprising causing execution of a map function.

6. The method of claim 1, wherein the user input further defines a single user input that defines a size of the first portion of the display.

7. The method of claim 1, wherein the display is a touch screen display.

8. The method of claim 1 further comprising:
receiving user input indicating scrolling of the map with at least a part of the first portion to be scrolled into the second portion of the display; and
causing at least the another one of compression or expansion of the first portion that is to be scrolled into the second portion of the display.

9. The method of claim 1, further comprising:
receiving user input indicating scrolling of the map with at least a part of the second portion to be scrolled into the first portion of the display; and
causing at least the one of compression or expansion of the second portion that is to be scrolled into the first portion of the display.

10. An apparatus comprising at least one processor and at least one memory storing computer program code, wherein the at least one memory and stored computer program code are configured, with the at least one processor, to cause the apparatus to at least:
receive user input defining a first portion of a display of a map and indicating selection of one of compression or expansion to apply to the first portion of the display;
cause, by a processor, the one of compression or expansion to the first portion of the display;
determine, based at least in part on the first portion of the display, at least one second portion of the display; and
cause another one of compression or expansion to the at least one second portion of the display such that the second portion of the display is modified in an opposite manner to the first portion of the display.

11. The apparatus of claim 10, wherein the at least one memory and stored computer program code are configured, with the at least one processor, to cause the apparatus to:
determine, based at least in part on a degree of the compression or expansion of the first portion of the display, a degree of the compression or expansion of the at least one second portion of the display.

12. The apparatus of claim 10, wherein the at least one memory and stored computer program code are configured, with the at least one processor, to cause the apparatus to:
cause compression of the at least one second portion of the display in an instance in which the first portion of the display is caused to expanded.

13. The apparatus of claim 10, wherein the at least one memory and stored computer program code are configured, with the at least one processor, to cause the apparatus to:
cause expansion of the at least one second portion of the display in an instance in which the first portion of the display is caused to compress.

14. The apparatus of claim 10, wherein the at least one memory and stored computer program code are configured, with the at least one processor, to cause the apparatus to:
cause execution of a map function.

15. The apparatus of claim 10, wherein the user input further defines a single user input that defines a size of the first portion of the display.

16. The apparatus of claim 10, wherein the display is a touch screen display.

17. The apparatus of claim 10, wherein the at least one memory and stored computer program code are configured, with the at least one processor, to cause the apparatus to:
receive user input indicating scrolling of the map with at least a part of the first portion to be scrolled into the second portion of the display; and
cause at least the another one of compression or expansion of the first portion that is to be scrolled into the second portion of the display.

18. The apparatus of claim 10, wherein the at least one memory and stored computer program code are configured, with the at least one processor, to cause the apparatus to:
receive user input indicating scrolling of the map with at least a part of the second portion to be scrolled into the first portion of the display; and
cause at least the one of compression or expansion of the second portion that is to be scrolled into the first portion of the display.

19. A computer program product comprising at least one non-transitory computer-readable storage medium having computer-readable program instructions stored therein, the computer-readable program instructions comprising program instructions configured to cause an apparatus to perform a method comprising:
receiving user input defining a first portion of a display of a map and indicating selection of one of compression or expansion to apply to the first portion of the display;
causing the one of compression or expansion to the first portion of the display;
determining, based at least in part on the first portion of the display, at least one second portion of the display; and
causing another one of compression or expansion to the at least one second portion of the display such that the second portion of the display is modified in an opposite manner to the first portion of the display.

20. The computer program product of claim 19, wherein the method further comprises:
determining, based at least in part on a degree of the compression or expansion of the first portion of the display, a degree of the compression or expansion of the at least one second portion of the display.

* * * * *